US012097975B1

(12) United States Patent
Gross

(10) Patent No.: US 12,097,975 B1
(45) Date of Patent: Sep. 24, 2024

(54) TAIL BOOM SUPPORT STAND ASSEMBLY

(71) Applicant: James P Gross, Bismarck, ND (US)

(72) Inventor: James P Gross, Bismarck, ND (US)

( * ) Notice: Subject to any disclaimer, the term of this patent is extended or adjusted under 35 U.S.C. 154(b) by 0 days.

(21) Appl. No.: 18/307,224

(22) Filed: Apr. 26, 2023

(51) Int. Cl.
*B64F 5/10* (2017.01)
*B25H 1/00* (2006.01)
*B25H 1/16* (2006.01)

(52) U.S. Cl.
CPC ............. *B64F 5/10* (2017.01); *B25H 1/0035* (2013.01); *B25H 1/16* (2013.01)

(58) Field of Classification Search
CPC . B64F 5/00; B64F 5/10; B25H 1/0035; B25H 1/0021; B25H 1/00; B25H 1/16
See application file for complete search history.

(56) References Cited

U.S. PATENT DOCUMENTS

| | | | |
|---|---|---|---|
| 6,769,644 B2 * | 8/2004 | Muylaert | B64C 27/50 244/17.11 |
| 7,676,923 B2 * | 3/2010 | Maille | B64C 27/82 264/249 |
| 9,651,935 B2 * | 5/2017 | Stone | B64F 5/10 |
| 2004/0118971 A1 * | 6/2004 | Muylaert | B64C 27/50 244/17.11 |
| 2006/0169835 A1 * | 8/2006 | Maille | B64F 5/10 244/17.19 |
| 2014/0163715 A1 * | 6/2014 | Stone | G05B 19/402 700/114 |

OTHER PUBLICATIONS https://safestructuredesigns.com/wp-content/uploads/2019/10/md-helicopters-md500-hangar-equiptment-specialty-tool-tail-boom-support-mounts-safety-first-ergonomic-osha-compliant-012-aircraft-maintenance-platforms.jpg; Safe Structure Designs; Apr. 26, 2023.

* cited by examiner

*Primary Examiner* — Lawrence Averick
(74) *Attorney, Agent, or Firm* — Fargo Patent & Business Law; Thomas Kading

(57) ABSTRACT

A tail boom support stand assembly for a tail boom of a helicopter includes a forward structure including a forward telescopic support assembly; a webbing arrangement mounted between a first and second boom support of the forward telescopic support assembly to provide a non-rigid cradle for the tail boom; an aft structure comprising an aft telescopic support assembly; a boom support channel of the aft telescopic support assembly to provide a rigid cradle for the tail boom; and a frame structure that interconnects the forward structure and the aft structure.

20 Claims, 8 Drawing Sheets

TAIL BOOM SUPPORT STAND ASSEMBLY

BACKGROUND

The present disclosure relates to aircraft maintenance equipment, and more specifically, to a tail boom support stand assembly for a helicopter.

Aircraft maintenance often utilizes specialized support equipment.

SUMMARY

A tail boom support stand assembly for a tail boom of a helicopter according to one disclosed non-limiting embodiment of the present disclosure includes a forward structure comprising a forward telescopic support assembly; a webbing arrangement mounted between a first and second boom support of the forward telescopic support assembly to provide a non-rigid cradle for the tail boom; an aft structure comprising an aft telescopic support assembly; a boom support channel of the aft telescopic support assembly to provide a rigid cradle for the tail boom; and a frame structure that interconnects the forward structure and the aft structure.

A further embodiment of any of the foregoing embodiments of the present disclosure includes that the forward structure further comprises a first and second fixed vertical support, the forward telescopic support assembly telescopically adjustable with respect to the first and second fixed vertical support by a forward tongue jack.

A further embodiment of any of the foregoing embodiments of the present disclosure includes that the first and second boom support extend perpendicular to a respective first and second vertical support telescopically mounted to a respective first and second fixed vertical support.

A further embodiment of any of the foregoing embodiments of the present disclosure includes a first and second diagonal support that extend between the respective first and second boom supports and a horizontal brace that extends between the first and second vertical support of the forward telescopic support assembly.

A further embodiment of any of the foregoing embodiments of the present disclosure includes that the webbing arrangement comprises a multiple of straps.

A further embodiment of any of the foregoing embodiments of the present disclosure includes a cushion within the boom support channel.

A further embodiment of any of the foregoing embodiments of the present disclosure includes that the aft telescopic support assembly further comprises a first and second vertical support, the aft telescopic support assembly telescopically adjustable with respect to a first and second fixed vertical support by an aft tongue jack.

A further embodiment of any of the foregoing embodiments of the present disclosure includes that the boom support channel is attached to a first horizontal brace attached between the first and second vertical support of the aft telescopic support assembly.

A further embodiment of any of the foregoing embodiments of the present disclosure includes a diagonal support between the boom support channel and a second horizontal brace attached between the first and second vertical support of the aft telescopic support assembly.

A further embodiment of any of the foregoing embodiments of the present disclosure includes a first and second adjustable horizontal stabilizer support mounted to the first horizontal brace.

A further embodiment of any of the foregoing embodiments of the present disclosure includes wherein each of the first and second adjustable horizontal stabilizer supports comprises a crank driven screw with stabilizing rods that are attached to a platform, the first and second adjustable horizontal stabilizer support adjustable with respect to the first horizontal brace.

A further embodiment of any of the foregoing embodiments of the present disclosure includes a cushion mounted to the platform to support a horizontal stabilizer of the tail boom.

A further embodiment of any of the foregoing embodiments of the present disclosure includes a lock knob assembly engageable with the crank driven screw of each adjustable horizontal stabilizer support to secure a vertical position thereof.

A further embodiment of any of the foregoing embodiments of the present disclosure includes a set of lockable casters mounted to the frame structure.

A further embodiment of any of the foregoing embodiments of the present disclosure includes that the frame structure comprises a longitudinal member between the forward structure and the aft structure.

A further embodiment of any of the foregoing embodiments of the present disclosure includes an X-shaped brace structure that intersects at a central portion of the longitudinal member, the longitudinal member attached to a forward cross brace and an aft cross brace.

A tail boom support stand assembly for a tail boom of a helicopter according to one disclosed non-limiting embodiment of the present disclosure includes a first and second vertical support of a forward telescopic support assembly; a first and second boom support that extend perpendicular to the respective first and second vertical support; a webbing arrangement mounted between the first and second boom support to provide a non-rigid cradle for the tail boom; a first and second vertical support of an aft telescopic support assembly; a boom support channel attached to a first horizontal brace attached between the first and second vertical support of the aft telescopic support assembly, the boom support channel provides a rigid cradle for the tail boom; a first and second adjustable horizontal stabilizer support mounted to the first horizontal brace, the first and second adjustable horizontal stabilizer support adjustable with respect to the first horizontal brace; a forward structure that supports the forward telescopic support assembly; an aft structure that supports the aft telescopic support assembly and a frame structure that interconnects the forward structure and the aft structure.

A further embodiment of any of the foregoing embodiments of the present disclosure includes that each of the first and second adjustable horizontal stabilizer supports comprises a crank driven screw with stabilizing rods that are attached to a platform.

A further embodiment of any of the foregoing embodiments of the present disclosure includes a cushion mounted to the platform to support a horizontal stabilizer of the tail boom; and a lock knob assembly engageable with the crank driven screw of each adjustable horizontal stabilizer support to secure a vertical position thereof.

A further embodiment of any of the foregoing embodiments of the present disclosure includes that the webbing arrangement comprises a multiple of straps.

The foregoing features and elements may be combined in various combinations without exclusivity, unless expressly indicated otherwise. These features and elements as well as the operation thereof will become more apparent in light of the following description and the accompanying drawings. It should be appreciated that however the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
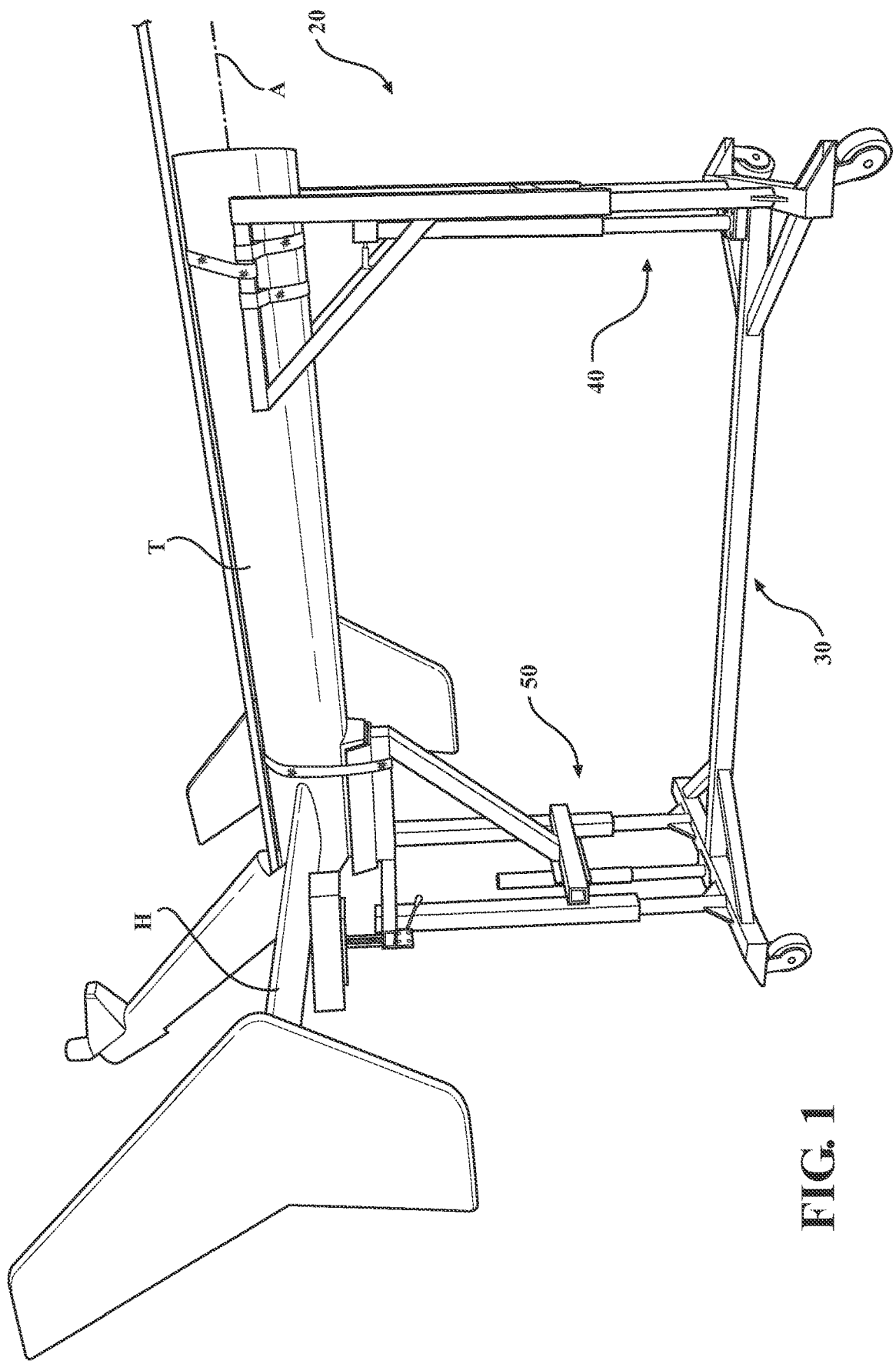
FIG. 1 is a perspective view of a tail boom support stand assembly with a tail boom supported thereon according to one disclosed non-limiting embodiment.

FIG. 1 schematically illustrates a tail boom support stand assembly 20 that may be used to support a tail rotor boom assembly T of a helicopter for maintenance. The tail boom support stand assembly 20 generally includes a frame structure 30, a forward structure 40 and an aft structure 50. The tail boom support structure 20 facilitates the support and removal of the tail rotor boom assembly T along an axis A which is generally parallel to the ground.

Figure 2:
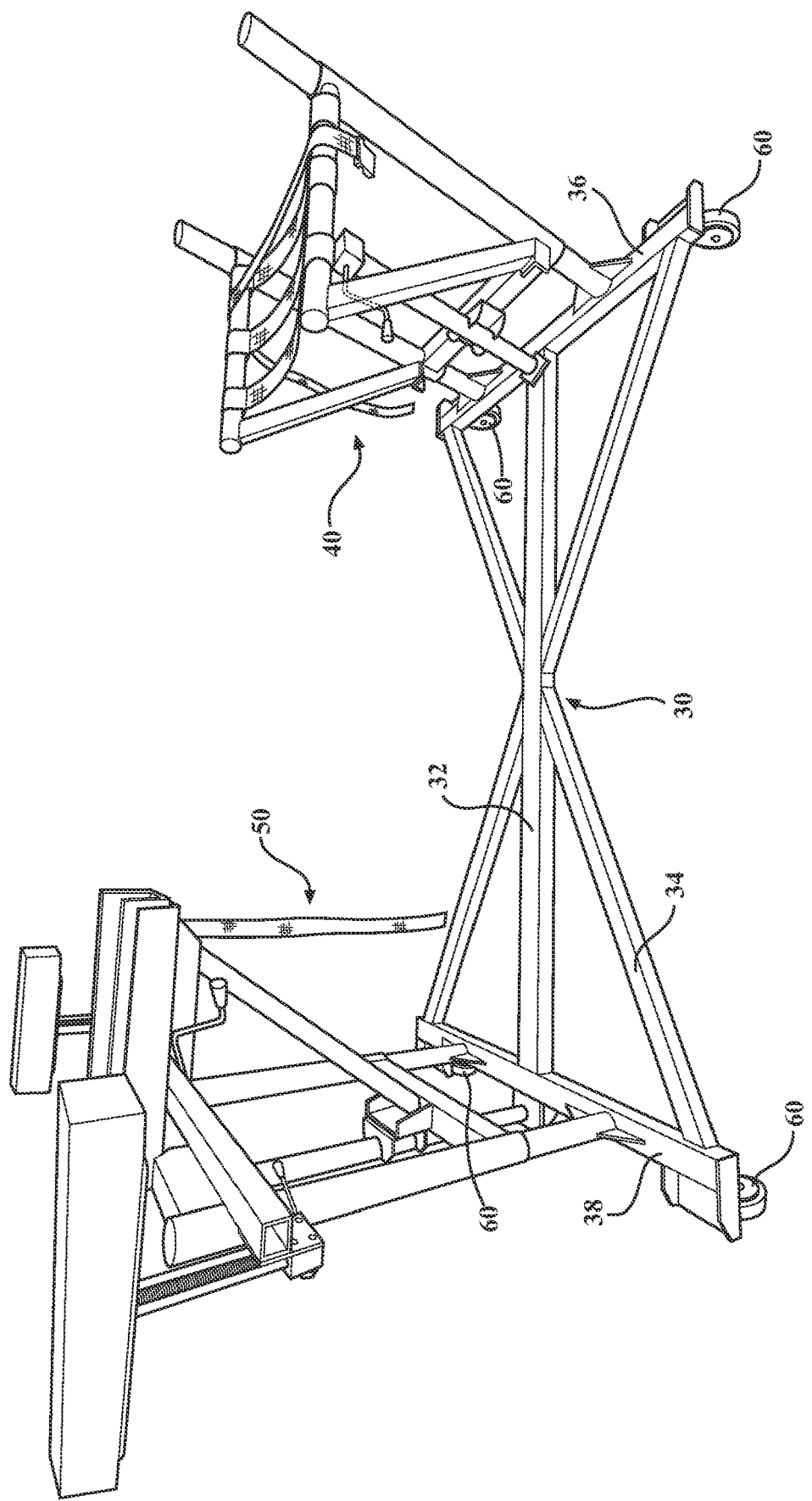
FIG. 2-3 are perspective views of a tail boom support stand assembly according to another disclosed non-limiting embodiment.
Figure 3:
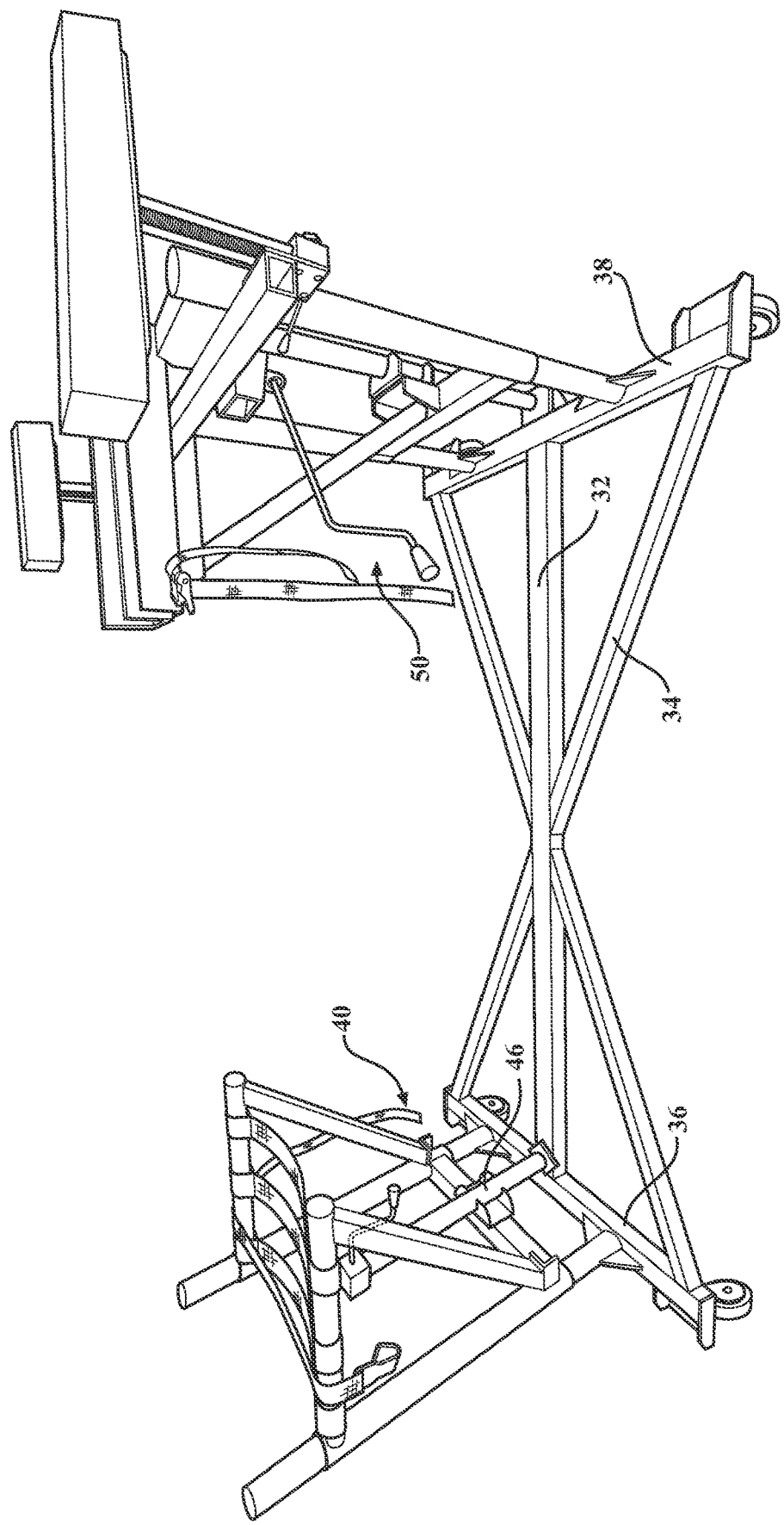

With reference to FIGS. 2 and 3, the frame structure 30 interconnects the forward structure 40 and the aft structure 50. The frame structure 30 includes lockable caster wheels 60 to permit the tail boom support structure 20 to be readily moved while the tail rotor boom assembly T is supported thereupon. That is, the tail boom support structure 20 is configured to support the entire weight of the tail rotor boom assembly T which includes a tail rotor and a drive system.

In one embodiment, the frame structure 30 may include a longitudinal member 32 between the forward structure 40 and the aft structure 50. An X-shaped brace structure 34 may intersect a central portion of the longitudinal member 32 and respectfully extend toward a forward cross brace 36 and an aft cross brace 38. Each cross brace 36, 38 supports two casters 60.

Figure 4:
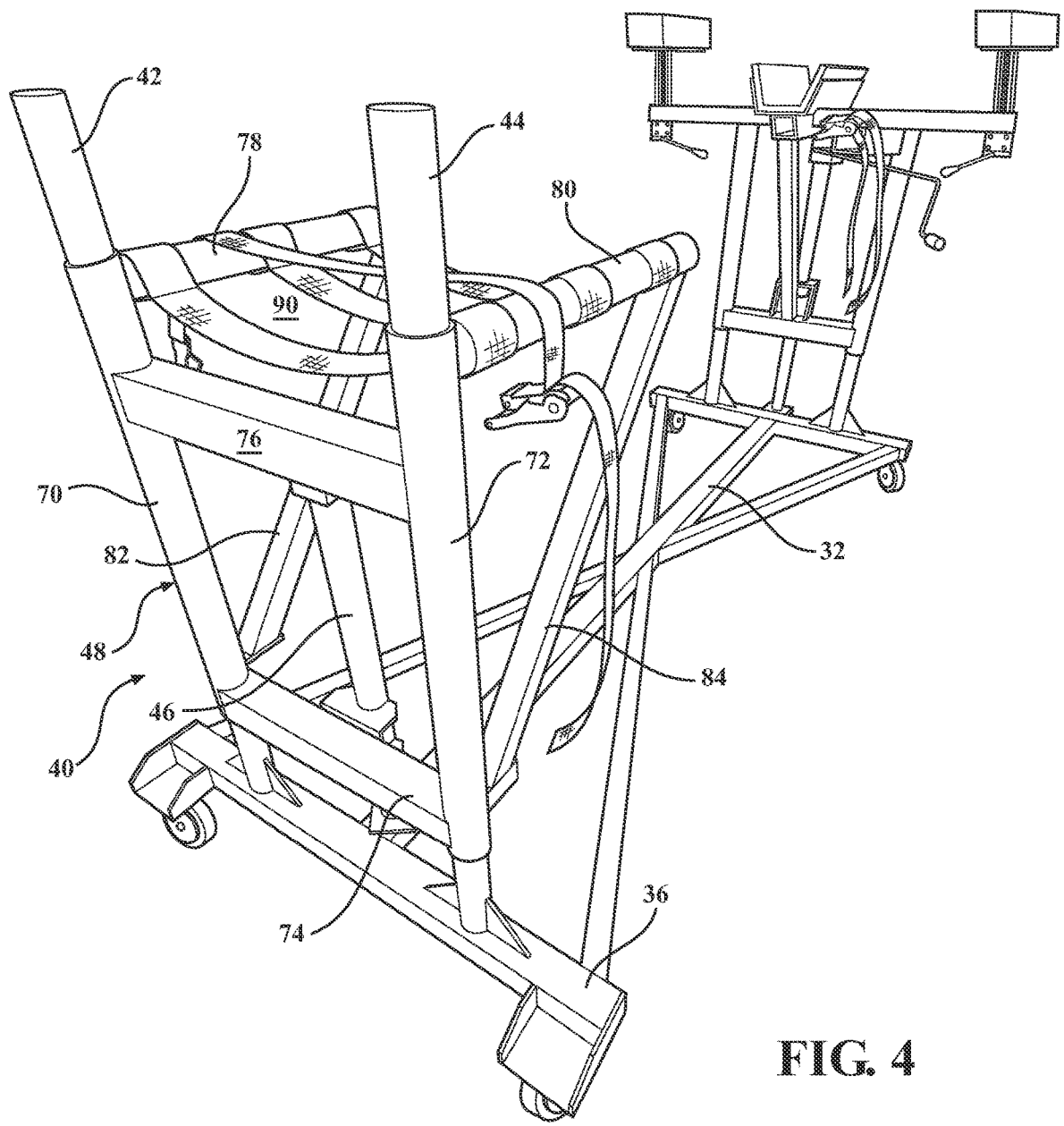
FIG. 4-5 are perspective views of a forward structure of the tail boom support stand assembly.
Figure 5:
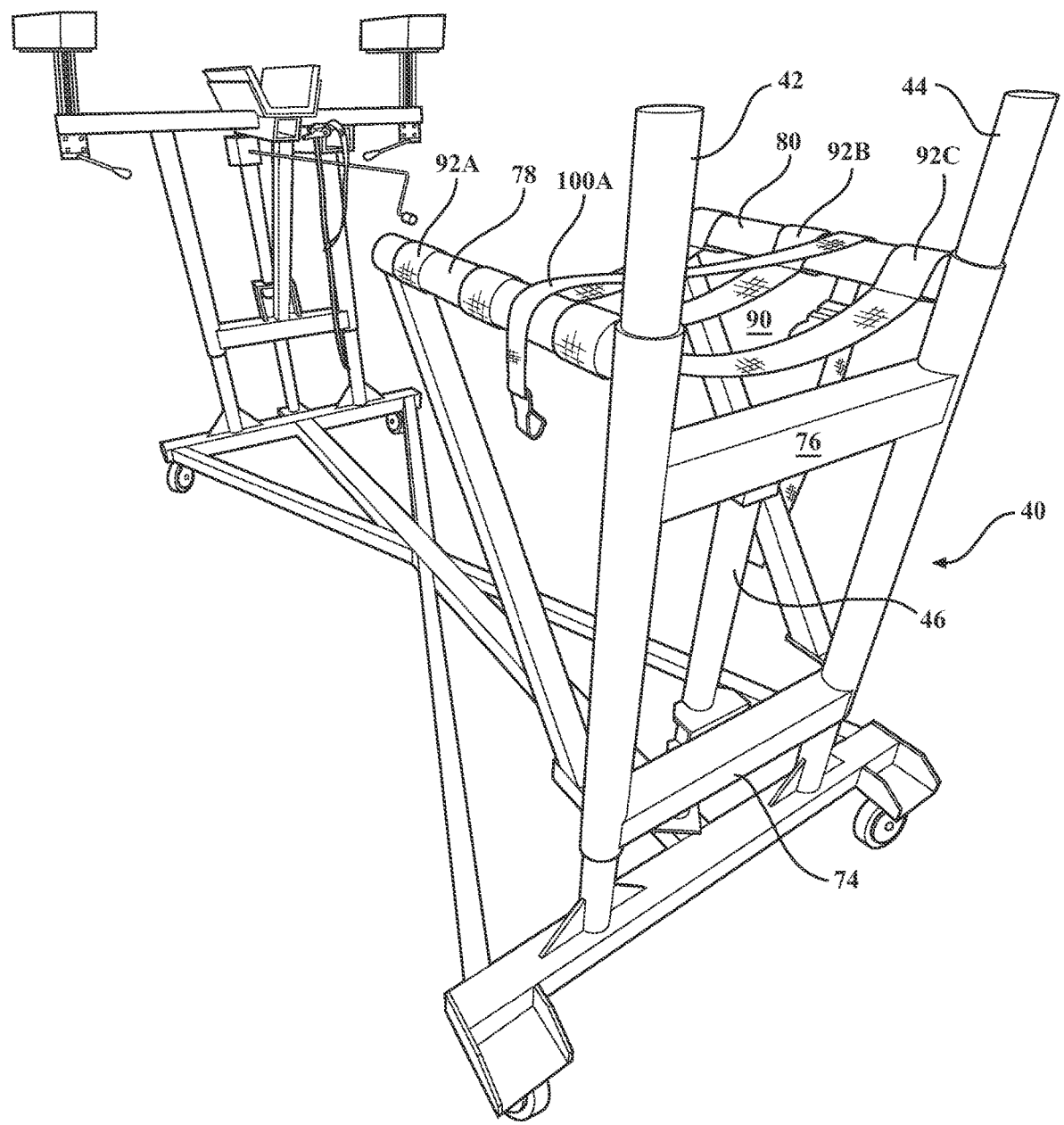

With reference to FIGS. 4 and 5, in one embodiment, the forward structure 40 includes a first fixed vertical support 42, a second fixed vertical support 44, a forward tongue jack 46, and a forward telescopic support assembly 48 telescopically adjustable with respect to the first and second fixed vertical support 42, 44 by the forward tongue jack 46. The first and second fixed vertical support 42, 44 may be tubular members that are welded to the forward cross brace 36 which is welded transverse to the longitudinal member 32. Two casters 60 may be mounted to the forward cross brace 36. Although a particular geometric arrangement is disclosed, it should be appreciated that other geometries may be utilized.

The forward tongue jack 46 may be welded to the longitudinal member 32 (best seen in FIG. 3) adjacent to the forward cross brace 36 to vertically position the telescopic support assembly 48. The forward tongue jack 46 typically includes a transmission of a bevel gear drive and a screw-nut driven by a crank. In other embodiments, other jacks may be provided.

The forward telescopic support assembly 48 generally includes a first and second vertical support 70, 72 with horizontal braces 74, 76. The first and second vertical support 70, 72 are telescopically mounted to the respective first and second fixed vertical support 42, 44. Boom supports 78, 80 extend perpendicular to the vertical support 70, 72. The boom supports 78, 80 may be further braced by diagonal supports 82, 84 that extend between the boom supports 78, 80 and the horizontal brace 74.

A webbing arrangement 90 is mounted between the boom supports 78, 80 to provide a non-rigid cradle for the tail rotor boom assembly T. The webbing arrangement 90 may, in one embodiment, include a multiple of straps 92A-92n that extend between the boom supports 78, 80. The multiple of straps 92A-92n may each include a strap with a loop on each end to slide onto the boom supports 78, 80. The multiple of straps 92A-92n need not be taught between the boom supports 78, 80 to provide a cradle like geometry arrangement to support the tail rotor boom assembly T at least partially between the boom supports 78, 80 along axis A. That is, the axis A along the tail rotor boom assembly T is generally in a plane formed by the boom supports 78, 80. A ratchet strap 100A may be used to secure the tail rotor boom assembly T to the boom supports 78, 80.

Figure 6:
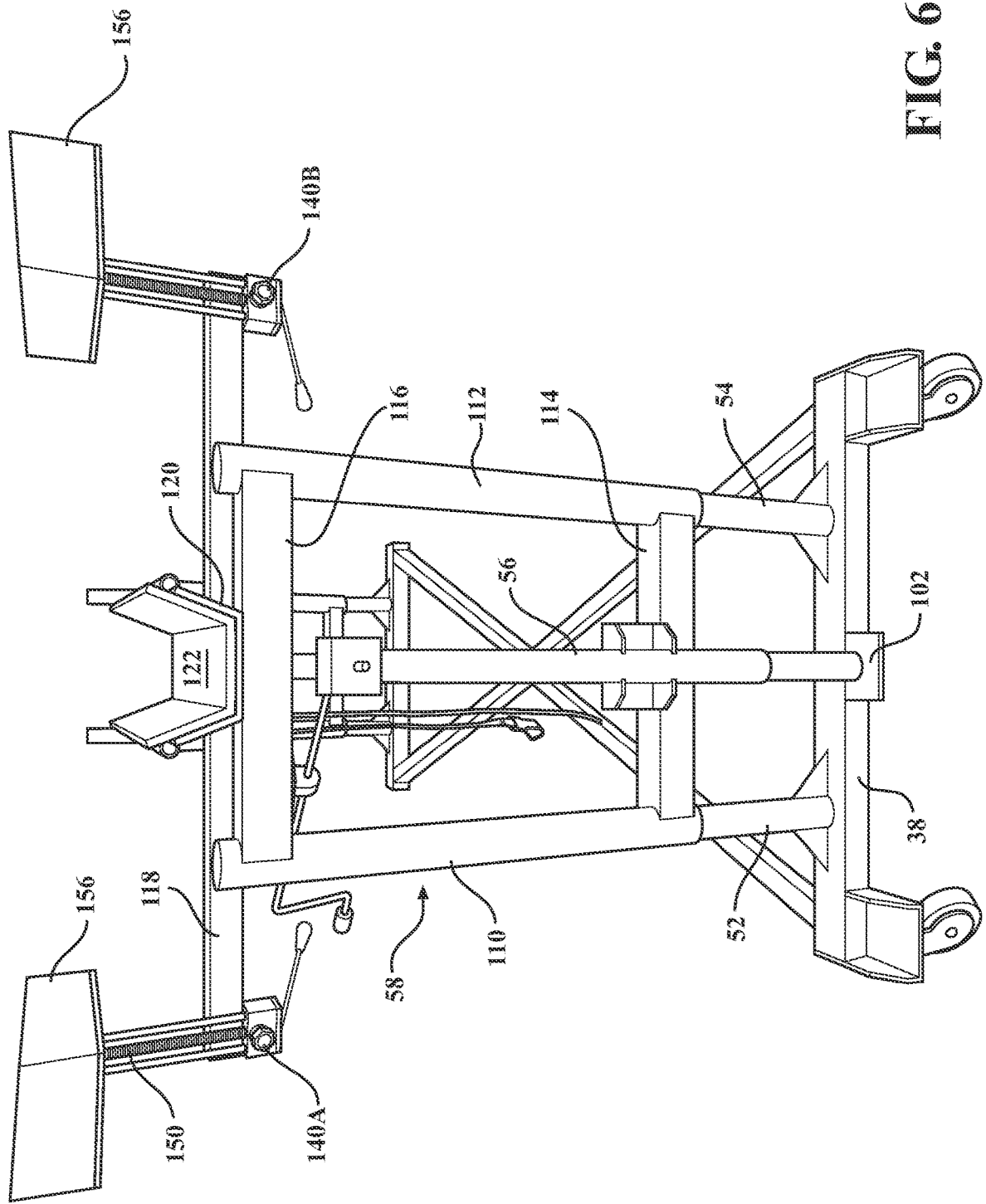
FIG. 6-8 are perspective views of an aft structure of the tail boom support stand assembly.
Figure 7:
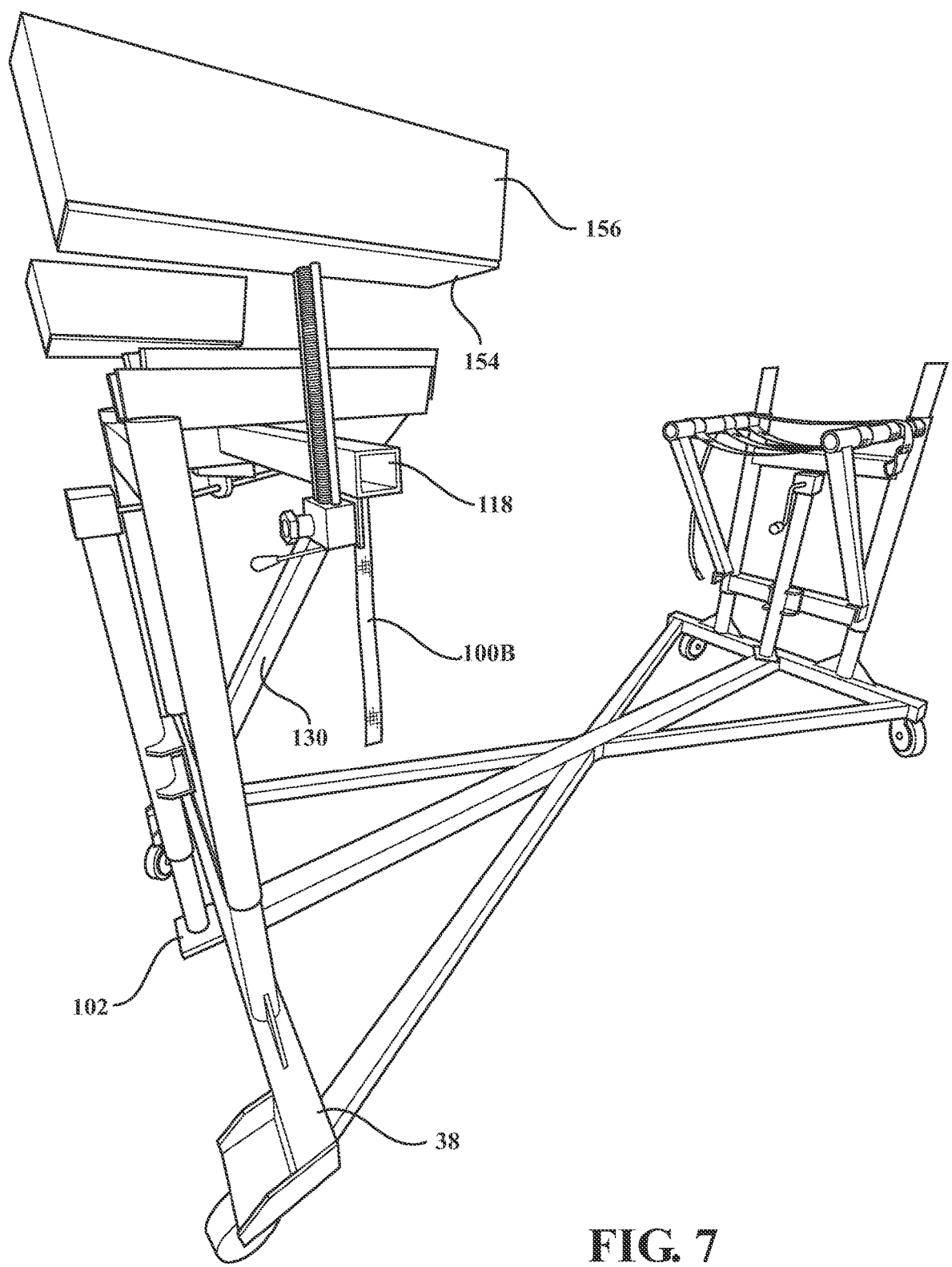
Figure 8:
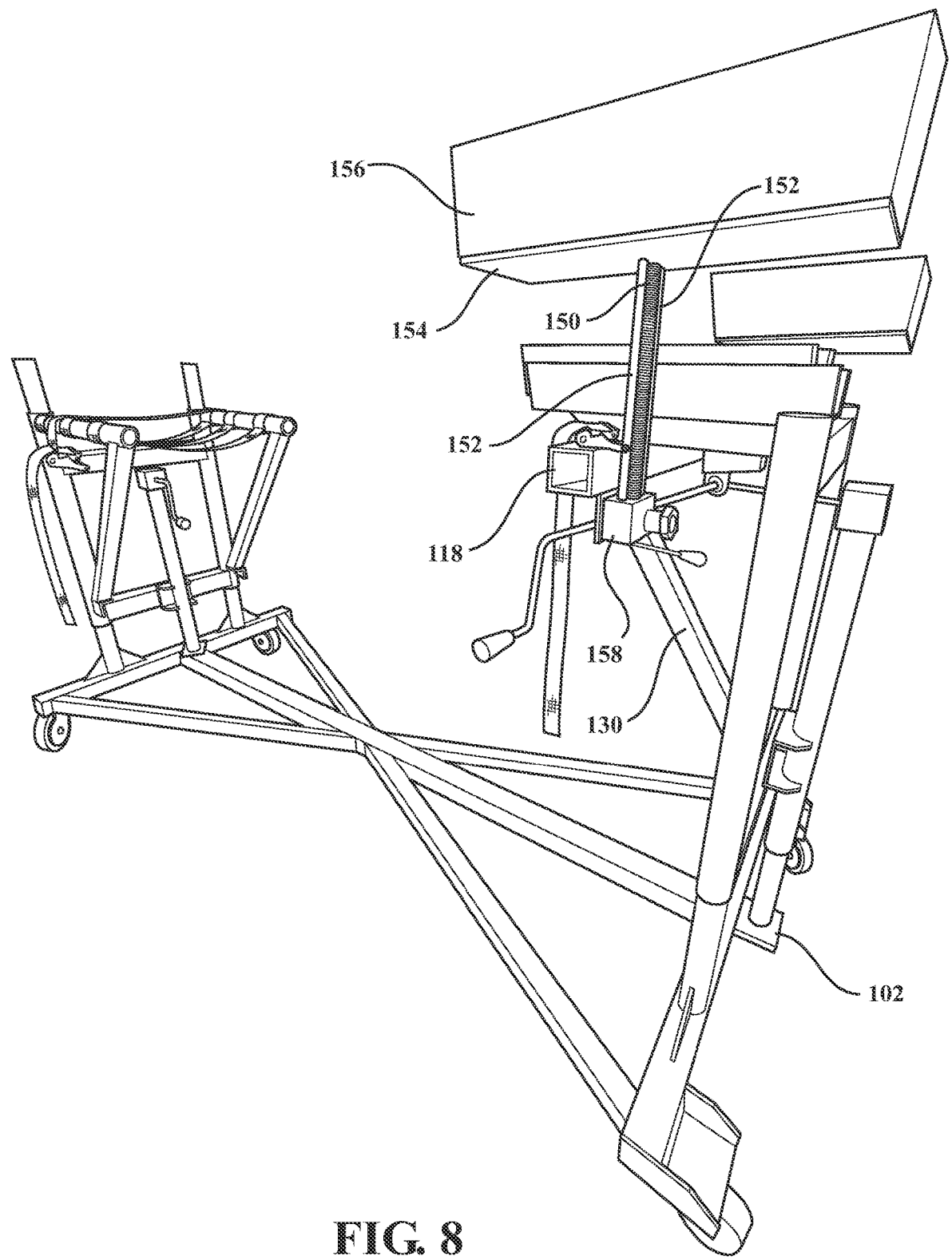

With reference to FIG. 6-8, in one embodiment, the aft structure 50 includes a first fixed vertical support 52, a second fixed vertical support 54, an aft tongue jack 56, and an aft telescopic support assembly 58 telescopically adjustable with respect to the first and second fixed vertical support 52, 54 by the aft tongue jack 56. The first and second fixed vertical support 52, 54 may be tubular members that are welded to the aft cross brace 38 which is welded transverse to the longitudinal member 32. Two casters 60 may be mounted to the aft cross brace 38. The aft cross brace 38 in this embodiment is parallel to the forward cross brace 36.

The aft tongue jack 56 may be welded to the aft cross brace 38 opposite the intersection of the longitudinal member 32 and the aft cross brace 38. In this embodiment a shelf 102 may extend from the aft cross brace 38 to support the aft tongue jack 56 which raises and lowers the aft telescopic support assembly 58.

The aft telescopic support assembly 58 includes a first and second vertical support 110, 112 with horizontal braces 114, 116, 118. The first and second vertical support 110, 112 are telescopically mounted to the respective first and second fixed vertical support 52, 54. A boom support channel 120 extends perpendicular, and is supported on, the horizontal braces 116, 118 along the axis A. The boom support channel 120 cradles the tail rotor boom assembly T. The boom support channel 120 may be further supported by a diagonal support 130 that extends between the boom support channel 120 and the horizontal brace 114.

In this embodiment, a cushion 122 lines the boom support channel 120 to cushion the tail rotor boom assembly T. A ratchet strap 100B may be used to secure the tail rotor boom assembly T to the boom support channel 120 (FIG. 1).

In this embodiment, an adjustable horizontal stabilizer support 140A, 140B are also mounted to the horizontal brace 118 to provide further support for a horizontal stabilizer H (FIG. 1) of the tail rotor boom assembly T. Each adjustable horizontal stabilizer support 140A, 140B includes a crank driven screw 150 with stabilizing rods 152 that are attached to a platform 154. A cushion 156 such as a foam block is attached to the platform 154 to provide a conformal support surface for the horizontal stabilizer H. A lock knob assembly 158 is engageable with the crank driven screw 150 of each adjustable horizontal stabilizer support 140A, 140B to secure the vertical position thereof.

In use, the tail boom support stand assembly 20 is rolled into position under the tail rotor boom assembly T and the casters 60 are locked. The forward structure 40 and the aft structure 50 are then independently adjusted to the height of the tail rotor boom assembly T. The adjustable horizontal stabilizer supports 140A, 140B are then height adjusted to provide support under the horizontal stabilizer H. The ratchet straps 100A, 100B are then tightened to secure the tail rotor boom assembly T to the tail boom support stand assembly 20. The tail rotor boom assembly T may then be disconnected from the fuselage of the aircraft. The casters 60 are then unlocked and the boom support assembly 20 with the tail rotor boom assembly T may then be readily transported by a single maintainer.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A tail boom support stand assembly for a tail boom of a helicopter, comprising:
   a forward structure comprising a forward telescopic support assembly;
   a webbing arrangement mounted between a first and second boom supports of the forward telescopic support assembly to provide a non-rigid cradle for the tail boom;
   an aft structure comprising an aft telescopic support assembly;
   a boom support channel of the aft telescopic support assembly to provide a rigid cradle for the tail boom; and
   a frame structure that interconnects the forward structure and the aft structure.

2. A tail boom support stand assembly for a tail boom of a helicopter, comprising:
   a first and second vertical support of a forward telescopic support assembly;
   a first and second boom support that extend perpendicular to the respective first and second vertical support;
   a webbing arrangement mounted between the first and second boom supports to provide a non-rigid cradle for the tail boom;
   a first and second vertical support of an aft telescopic support assembly;
   a boom support channel attached to a first horizontal brace attached between the first and second vertical support of the aft telescopic support assembly, the boom support channel provides a rigid cradle for the tail boom;
   a first and second adjustable horizontal stabilizer support mounted to the first horizontal brace, the first and second adjustable horizontal stabilizer support adjustable with respect to the first horizontal brace;
   a forward structure that supports the forward telescopic support assembly;
   an aft structure that supports the aft telescopic support assembly; and
   a frame structure that interconnects the forward structure and the aft structure.

3. The tail boom support stand assembly as recited in claim 2, wherein the forward structure comprises a first and second fixed vertical support, the forward telescopic support assembly telescopically adjustable with respect to the first and second vertical support by a forward tongue jack.

4. The tail boom support stand assembly as recited in claim 3, wherein the first and second boom support extend perpendicular to a respective first and second vertical support telescopically mounted to a respective first and second fixed vertical support.

5. The tail boom support stand assembly as recited in claim 4, further comprising a first and second diagonal supports that extend between the respective first and second boom supports and a horizontal brace that extends between the first and second vertical support of the forward telescopic support assembly.

6. The tail boom support stand assembly as recited in claim 5, wherein the webbing arrangement comprises a multiple of straps.

7. The tail boom support stand assembly as recited in claim 2, further comprising a cushion within the boom support channel.

8. The tail boom support stand assembly as recited in claim 2, wherein the aft telescopic support assembly further comprises a first and second vertical support, the aft telescopic support assembly telescopically adjustable with respect to the first and second fixed vertical support by an aft tongue jack.

9. The tail boom support stand assembly as recited in claim 8, wherein the boom support channel is attached to a first horizontal brace attached between the first and second vertical support.

10. The tail boom support stand assembly as recited in claim 9, further comprising a diagonal support between the boom support channel and a second horizontal brace attached between the first and second aft vertical support.

11. The tail boom support stand assembly as recited in claim 9, further comprising a first and second adjustable horizontal stabilizer support mounted to the first horizontal brace.

12. The tail boom support stand assembly as recited in claim 11, wherein each of the first and second adjustable horizontal stabilizer support comprises a crank driven screw with stabilizing rods that are attached to a platform, the first and second adjustable horizontal stabilizer support adjustable with respect to the first horizontal brace.

13. The tail boom support stand assembly as recited in claim 12, further comprising a cushion mounted to the platform to support a horizontal stabilizer of the tail boom.

14. The tail boom support stand assembly as recited in claim 12, further comprising a lock knob assembly engageable with the crank driven screw of each adjustable horizontal stabilizer support to secure a vertical position thereof.

15. The tail boom support stand assembly as recited in claim 2, further comprising a set of lockable casters mounted to the frame structure.

16. The tail boom support stand assembly as recited in claim 15, wherein the frame structure comprises a longitudinal member between the forward structure and the aft structure.

17. The tail boom support stand assembly as recited in claim 16, further comprising an X-shaped brace structure that intersects at a central portion of the longitudinal member, the longitudinal member attached to a forward cross brace and an aft cross brace.

18. The tail boom support stand assembly as recited in claim 2, wherein each of the first and second adjustable horizontal stabilizer support comprises a crank driven screw with stabilizing rods that are attached to a platform.

19. The tail boom support stand assembly as recited in claim 18, further comprising:
　　a cushion mounted to the platform to support a horizontal stabilizer of the tail boom; and
　　a lock knob assembly engageable with the crank driven screw of each adjustable horizontal stabilizer support to secure a vertical position thereof.

20. The tail boom support stand assembly as recited in claim 19, wherein the webbing arrangement comprises a multiple of straps.

* * * * *